(12) United States Patent
Matsuno et al.

(10) Patent No.: US 6,255,891 B1
(45) Date of Patent: Jul. 3, 2001

(54) TEMPERATURE DETECTING CIRCUIT, TEMPERATURE DETECTING METHOD AND PHOTO-ELECTRIC CONVERSION APPARATUS

(75) Inventors: Yasushi Matsuno, Fujisawa; Mahito Shinohara, Machida, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,373

(22) Filed: Aug. 4, 1999

(30) Foreign Application Priority Data

Aug. 27, 1998 (JP) .................................. 10-241854

(51) Int. Cl.⁷ ................................................ H03K 3/42
(52) U.S. Cl. .......................................... 327/512; 327/513
(58) Field of Search ................................ 327/512, 513, 327/538, 539, 540

(56) References Cited

U.S. PATENT DOCUMENTS 5,063,342 * 11/1991 Hughes et al. ..................... 323/315
5,583,397 * 12/1996 Ogawa ............................... 315/151

* cited by examiner

*Primary Examiner*—Tuan T. Lam
*Assistant Examiner*—Hiep Nguyen
(74) *Attorney, Agent, or Firm*—Morgan & Finnegan LLP

(57) ABSTRACT

An object of the invention is to detect precisely a temperature in a temperature detection circuit for taking the temperature of a semiconductor substrate, wherein a first bipolar transistor Q1 and a second bipolar transistor Q2 that have different emitter areas and have the same polarities are fabricated in a single substrate and connected in parallel to each other, of which respective collectors are connected to a DC voltage source while a base of the first transistor Q1 having a lager emitter area is connected to a reference voltage source, an emitter is connected to a first constant current source 1, a base of the second transistors Q2 is connected to an output terminal of an operational amplifier 3 and an emitter is connected to a second constant current source 2, the respective emitters of the transistor Q1 and Q2 being separately connected to individual input terminals of the operational amplifier 3 and the temperature of the semiconductor substrate being detected from an output voltage produced from the operational amplifier 3.

18 Claims, 4 Drawing Sheets

1 : 1ST CONSTANT CURRENT SOURCE
2 : 2ND CONSTANT CURRENT SOURCE
3 : OPERATIONAL AMPLIFIER
Q1: 1ST BIPOLAR TRANSISTOR
Q2: 2ND BIPOLAR TRANSISTOR

Q3: BIPOLAR TRANSISTOR
Q4: BIPOLAR TRANSISTOR

4 : CONSTANT CURRENT SOURCE
5 : CONSTANT CURRENT SOURCE
Q5: BIPOLAR TRANSISTOR
Q6: BIPOLAR TRANSISTOR

TEMPERATURE DETECTING CIRCUIT, TEMPERATURE DETECTING METHOD AND PHOTO-ELECTRIC CONVERSION APPARATUS

BACKGROUND OF THE INVENTION

1. Field of the Invention

The present invention relates to a temperature detecting circuit, a temperature detecting method and a photo-electric conversion apparatus which are constituted, in particular, on a semiconductive substrate.

2. Brief Description of the Related Art

FIG. 7 (PRIOR ART) is a circuit diagram illustrating a conventional constitution of a temperature detection circuit for taking a temperature of a semiconductor substrate. This circuit is constituted of a bipolar transistor Q11 embedded in the semiconductor substrate and a constant current source 11 for flowing a constant current I11 which is connected between a collector electrode of the transistor Q11 and a direct current (referred to as "DC" hereinafter) voltage source Vcc.

In the circuit constituted as mentioned above, the constant current source 11 feeds the constant current I11 to a diode which constitutes the transistor Q11, thereby to generate a forward bias voltage Vf. This forward bias voltage Vf has a temperature characteristics corresponding to the temperature of the semiconductor substrate. Accordingly, one can detect the temperature of the semiconductor substrate from this temperature characteristics.

However, in the conventional example as mentioned above, there exist various problems such as a variance in absolute value of the forward bias voltage Vf of the transistor Q11 which is induced by dispersion in device manufacturing parameters, another variance in the forward bias voltage Vf which is invited by a variation in constant current I11 which is inherent to a performance in constant current characteristics of the constant current circuit 11 and still another variance in temperature characteristics of the transistor Q11 which is introduced by a temperature-dependent variation of the constant current source 11.

Consequently, it is intended to supply the constant current from an external source to eliminate the variances in the constant current I11. However, this intention increases a terminal number and, further, a number of external components, which encounters another problem of an excessive manufacturing cost.

Furthermore, in a case when the circuit is fabricated by using a Complementary Metal Oxide Semiconductor (referred to as "CMOS") device manufacturing process, one of electrodes of the diode is fixed either to a supply voltage or to a grounding potential because of the manufacturing process steps, which results in still another problem that a restriction in output voltage takes place.

On the other hand, in another case when a photo-electric conversion device (referred to as "photosensor" hereinafter) is fabricated on the semiconductor substrate, dark current characteristics which is inherent to the photosensor cannot be neglected and appears as a fixed pattern noise. As a correction measures of the fixed pattern noise, it is proposed to fabricate above-mentioned temperature detection circuit on the same substrate as that the photosensor is formed in, thereby to compensate the pattern noise by using the temperature. However, the correction or the compensation itself not only is unexpectable in precision as well as by cost due to the previously cited problems but also brings about further still another problem that it imposes excessively a restriction on species of employable devices because the device manufacturing processes are limited to that of the photosensor device.

SUMMARY OF THE INVENTION

The present invention is carried out to solve the problems mentioned above. An object of the invention is to provide a temperature detection circuit and a temperature detection method which are immune against a dispersion in manufacturing parameters even when they are constituted at a reduced cost.

Another object of the invention is to constitute all of the circuits in a single substrate, thereby to provide further advantageous temperature detection circuit and temperature detection method at an economical production cost.

Still another object of the invention is to fabricate the temperature detection circuit in the same substrate as that of a photo-electric conversion device, thereby to provide a photo-electric conversion apparatus which is excellent in temperature characteristics.

To satisfy above-mentioned purposes, temperature detection circuits according to the present invention are constituted as follows:

(1) A temperature detection circuit comprises:
   two rectification means each having a rectifying characteristics which are connected in parallel to each other; and
   a temperature detection mean for taking a temperature from a temperature characteristics of a differential voltage between two respective voltages which are generated by applying a current density ratio to the two rectification means.

(2) The temperature detection circuit described in (1) is further constituted, wherein:
   the rectification means include a bipolar transistor; and
   the detection means takes the temperature from the temperature characteristics of the differential voltage between respective voltages across respective emitter-base junctions which are generated by applying the current density ratio to the two bipolar transistors.

(3) A temperature detection circuit comprises:
   a first bipolar transistor of which collector is connected to a DC voltage source, of which base is connected to a reference voltage source having no temperature-dependent characteristics and of which emitter is connected both to a first constant current source and to one of input terminals of an operational amplifier; and
   a second bipolar transistor of which collector is connected to the DC voltage source, of which base is connected to an output terminal of the operational amplifier and of which emitter is connected both to a second constant current source and to another of the input terminals of the operational amplifier, wherein:
   a temperature characteristics is obtained from an output produced from the operational amplifier.

(4) The temperature detection circuit described in (3) is further constituted, wherein:
   the first bipolar transistor and the second bipolar transistor are formed in a single semiconductor substrate.

(5) The temperature detection circuit described in (3) is still further constituted, wherein:
   an emitter size of the first bipolar transistor is enlarged larger than that of the second bipolar transistor; and
   a current value fed from the second constant current source is enhanced higher than that fed from the first constant current source, thereby to apply an emitter current density ratio to the two transistors.

(6) The temperature detection circuit described in (3) is more still further constituted, wherein:

a gain of the operational amplifier is enhanced higher, thereby to produce a large voltage output for detecting enough the temperature characteristics.

To satisfy above-mentioned objects, a method of detecting a temperature according to the present invention is constituted as follows:

(7) A method of detecting a temperature comprises steps of:

fabricating two bipolar transistors connected in parallel to each other on a single semiconductor substrate;

applying a current density ratio to respective emitter electrodes of the two bipolar transistors; and detecting a temperature of the semiconductor substrate from a temperature characteristics of a differential voltage between the two respective emitter-base voltages which are generated by the step of applying the current density ratio to the two emitter electrodes.

To satisfy above-mentioned purposes, photo-electric conversion apparatus according to the present invention are constituted as follows:

(8) A photo-electric conversion apparatus formed on a single semiconductor substrate comprises:

a photosensor device for converting an incident optical signal into an electric signal;

a temperature detection circuit, including:

two rectification means each having a rectifying characteristics which are connected in parallel to each other and a detection means for detecting a temperature from a temperature characteristics of a differential voltage between two respective voltages across the two rectification means which are generated by means of applying a current density ratio to the two rectification means; and a correction means for calibrating an output voltage produced from the photosensor device corresponding to a detection result delivered from the detection means.

(9) The photo-electric conversion apparatus described in (8) is further constituted, wherein:

the rectification means includes a bipolar transistor; and the detection means detects the temperature from the temperature characteristics of the differential voltage between the two respective voltages across respective emitter-base junctions which are generated by means of applying the current density ratio to the two bipolar transistors.

(10) The photo-electric conversion apparatus described in (9) is still further constituted, wherein:

the temperature detection circuit comprises:

a first bipolar transistor of which collector is connected to a DC voltage source, of which base is connected to a reference voltage source having no temperature-dependent characteristics and of which emitter is connected both to a first constant current source and to one of input terminals of an operational amplifier; and a second bipolar transistor of which collector is connected to the DC voltage source, of which base is connected to an output terminal of the operational amplifier and of which emitter is connected both to a second constant current source and to another of the input terminals of the operational amplifier, and the temperature characteristics is attained from an output voltage produced from the operational amplifier.

(11) The photo-electric conversion apparatus described in (10) is moreover still further constituted, wherein:

the temperature detection circuit applies the emitter current density ratio by enlarging an emitter size of the first bipolar transistor larger than that of the second bipolar transistor and by increasing a current value fed from the second constant current source higher than that fed from the first constant current source.

(12) The photo-electric conversion apparatus described in (10) is modified, wherein:

the temperature detection circuit receives a large output voltage for detecting enough the temperature characteristics by enhancing an amplification gain of the operational amplifier.

The other objects of the present invention will be clarified by the following specification and the drawings.

DETAILED DESCRIPTION OF THE PREFERRED EMBODIMENTS

Hereinafter detailed are the preferred embodiments according to the present invention with reference to the drawings from FIGS. 1 to 5. The best modes contemplated by the inventors during carrying out the invention into practice will also be described corresponding to the preferred embodiments.

Figure 1:
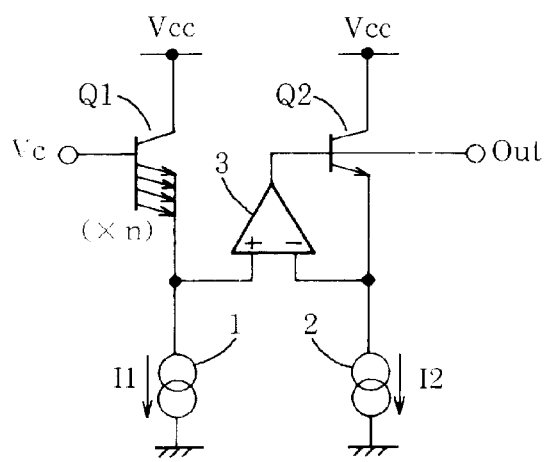
FIG. 1 is a circuit diagram showing a constitution of a first embodiment according to the present invention.

FIG. 1 is a circuit diagram showing a constitution of a first embodiment according to the present invention. In the figure, an alphabetic character Q1 stands for a first NPN-type bipolar transistor of which collector is connected to a DC voltage source having a voltage of Vcc, of which base is connected to a reference voltage source having a temperature-independent characteristic voltage Vc and of which emitter is connected both to a first constant current source 1 for feeding a current I1 and to an inverted input terminal of an operational amplifier 3. Meanwhile Q2 stands for a second bipolar transistor having the same polarity as that of the first bipolar transistor Q1 connected in parallel to the first bipolar transistor Q1 to each other of which collector is connected to the DC voltage source, of which base is connected to an output terminal of the operational amplifier 3 and of which emitter is connected both to a second constant current source 2 for feeding a current I2 and to a non-inverted input terminal of the operational amplifier 3.

At least the first transistor Q1 and the second transistor Q2 mentioned above are formed on a single semiconductor substrate. An emitter size of the first transistor Q1 is enlarged in area larger than that of the second transistor Q2 wherein a multiplication factor n is taken as n>1 (unity). Furthermore, the current I2 fed from the second constant current source 2 is increased compared with the current I1 fed from the first constant current source 1, which enhances an emitter current density ratio further.

The present circuit is constituted so as to provide the emitters of the two transistors Q1 and Q2 with the current density ratio obtained as mentioned above and so as to detect a temperature of the semiconductor substrate from a temperature characteristics of thereby obtained differential voltage between the two voltages across the respective emitter-base junctions. An output voltage Vout produced from the operational amplifier 3 is represented by Equation (1) when the voltage across the emitter-base junction of the transistor Q1 is denoted by $V_{BE}1$ and the voltage across the emitter-base junction of the transistor Q2 is denoted by $V_{BE}2$.

$$\text{Vout}=Vc-(V_{BE}1-V_{BE}2) \tag{1}$$

If the two current values I1 and I2 fed, respectively, from the two constant current sources 1 and 2 are herein equal, namely I1=I2, the output voltage Vout mentioned above is approximately represented by Equation (2).

$$\text{Vout} \approx Vc - Vt \times \log_e(1/n) \tag{2}$$

Herein Vt is the thermal voltage, namely=KT/q, wherein K is the Boltzmann's constant, T is a temperature in ° K. (degree Kelvin), q is an electronic charge quantity and n is an emitter area ratio between Q1 and Q2.

Accordingly, the output voltage Vout is decided by the emitter size (area) ratio of the transistors Q1 and Q2. Further, the temperature characteristics defined by Equation (3) is undoubtedly decided only by the emitter size ratio n.

$$d\text{Vout}/dT = -K/q \times \log_e(1/n) \tag{3}$$

However, the temperature dependence K/q of the thermal voltage Vt mentioned above is extremely small as about 0.086 mV/° C. so that a considerably large emitter size ratio between transistor Q1 and Q2 is necessary for producing a large output voltage variation. Consequently, if the current I2 fed from the second constant current source 2 is increased to m times (m>1) of the current I1 fed from the first constant current source 1 so that I2=m×I1, the output voltage Vout is represented by Equation (4) and produces a large variation in output voltage.

$$\text{Vout}=Vc-Vt \times \log_e(m \times n)^{-1} \tag{4}$$

When the temperature detection circuit is embedded in the single semiconductor substrate as mentioned above, to constitute the circuit so that a temperature coefficient of the output voltage Vout is determined only by the size ratio of the transistors Q1 and Q2 enables an economical and high-precision temperature detection.

Figure 2:
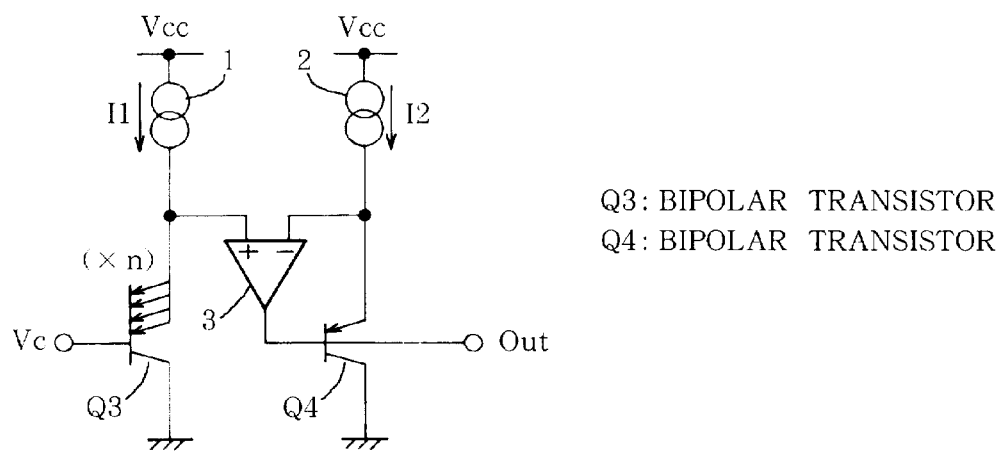
FIG. 2 is a circuit diagram showing a constitution of a second embodiment according to the present invention.

FIG. 2 is a circuit diagram showing a constitution of a second embodiment according to the present invention, wherein the same characters as those of the first embodiment shown in FIG. 1 represent the same constituents.

The present embodiment employs two PNP-type bipolar transistors Q3 and Q4 of which polarities are quite inverted to those that the transistors Q1 and Q2 shown in FIG. 1 have. An output voltage Vout of the present embodiment is represented by Equation (5).

$$\text{Vout}=Vc-Vt \times \log_e(1/n \times I1/I2) \tag{5}$$

Herein a temperature coefficient of the output voltage is represented by Equation (6).

$$d\text{Vout}/dT=-K/q \times \log_e(1/n \times I1/I2) \tag{6}$$

Accordingly, the present circuit exhibits an equivalent effectiveness to that of the first embodiment.

Figure 3:
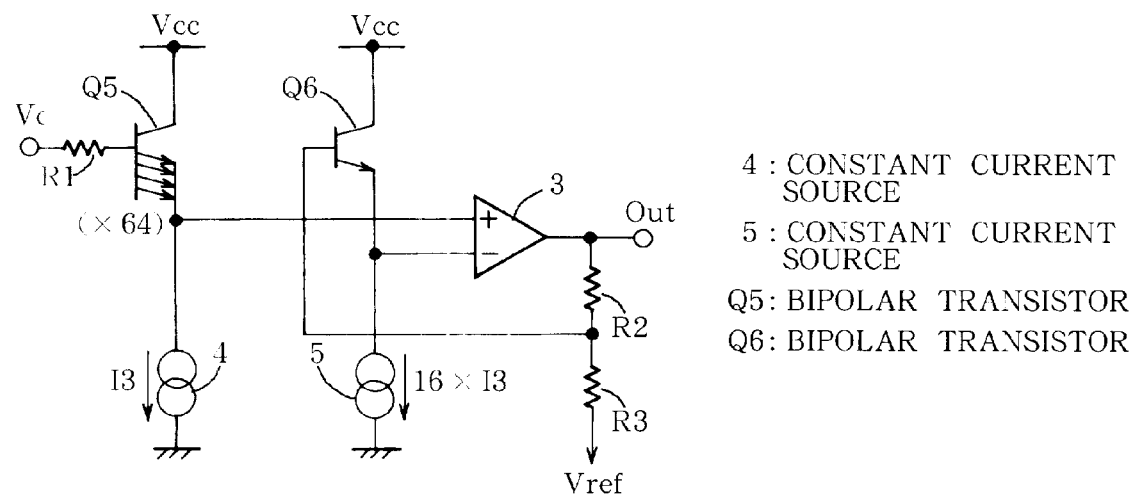
FIG. 3 is a circuit diagram showing a constitution of a third embodiment according to the present invention.

FIG. 3 is a circuit diagram showing a constitution of a third embodiment according to the present invention. In the figure, Q5 and Q6 stands for two bipolar transistors, respectively, which are connected in parallel to each other.

In the present embodiment, a base of the transistor Q5 is connected through a resistor R1 to a reference voltage source Vc having no temperature-dependent characteristics, an emitter of the transistor Q5 is connected both to a constant current source 4 for feeding a current I3 and to a non-inverted input terminal of an operational amplifier 3 and a collector of the transistor Q5 is connected to a DC voltage source Vcc. An emitter of the transistor Q6 is connected both to an inverted input terminal of the operational amplifier 3 and to a constant current source 5 for feeding a current of 16 ×I3, namely a 16-times larger current of the current I3 which is fed from the constant current source 4, a collector of the transistor Q6 is connected to a DC voltage source Vcc and a base of the transistor Q6 is connected both through a resistor R2 to an output terminal of the operational amplifier 3 and through a resistor R3 to a reference voltage source Vref having no temperature-dependent characteristics. Herein the former transistor Q5 has a 64 times larger emitter size than that of the latter transistor Q6.

An output voltage Vout of the present circuit is approximately represented by Equation (7).

$$\text{Vout} \approx G \times Vt \times \log_e(16 \times 64) + G \times Vc - (G-1) \times Vref \tag{7}$$

wherein G=(1+R2/R3).

Further, its temperature coefficient is represented by Equation (8).

$$d\text{Vout}/dT=G \times K/q \, \log_e(1024) \tag{8}$$

If resistivity values of the resistors are herein taken as, for instance, R2=39.5K ohm and R3=2K ohm, respectively, the output voltage Vout of about 12.4 mV/° C. is obtained.

As both the absolute value and the temperature coefficient of the output voltage Vout are constituted so as to be dependent upon the emitter size ratio and the current ratio as mentioned above, the measured value is immune against the dispersion of the manufacturing process parameters during fabricating the sensor device and the large output in temperature characteristics are obtained by means of enhancing the gain in the operational amplifier 3.

Incidentally, the collectors of the bipolar transistors Q1–Q6 which act as the temperature detection devices in the circuits shown in FIGS. 1–3 are capable of being connected to a substrate potential of the semiconductor substrate so that those devices can be manufactured comparatively independent of the manufacturing processes of the semiconductor devices no matter what they may be a CMOS process, a sensor CMOS process or the others.

Subsequently, exemplary photo-electric conversion apparatuses wherein the above-mentioned temperature detection circuits shown in FIGS. 1–3 and a photosensor are formed on a single semiconductor substrate are described with reference to FIGS. 4 and 5.

Figure 4:
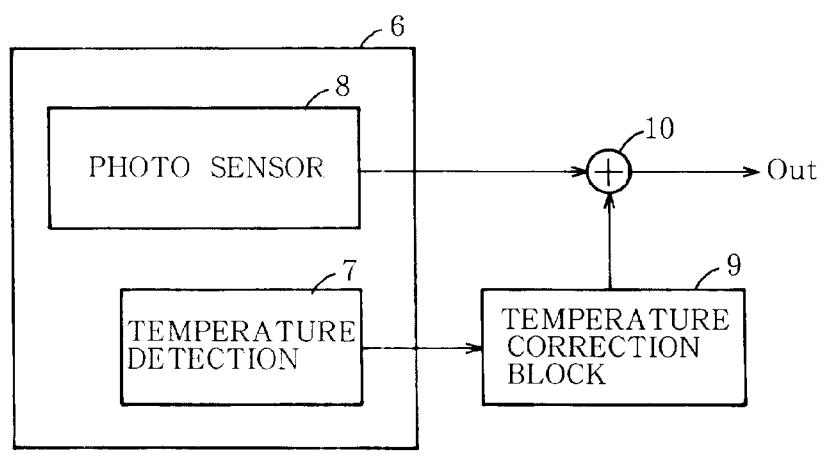
FIG. 4 is a block diagram showing a schematic constitution of a fourth embodiment according to the present invention.

FIG. 4 is a block diagram showing a fourth embodiment according to the present invention. In the figure, 6 stands for a semiconductor substrate, 7 stands for the above-mentioned temperature detection circuit for taking a temperature of the semiconductor substrate, 8 stands for the photosensor (a photo-electric conversion device), 9 stands for a temperature correction means for calibrating the output of the photosensor 8 corresponding to the output produced from the temperature detection circuit 7 and 10 stands for an arithmetic unit (referred to as "ALU").

As mentioned above, to fabricate the photosensor 8 and the above-mentioned temperature detecting circuit 7 monolithically on a single semiconductor wherein the respective outputs are processed by the external temperature correcting means 9 enables to produce a sensor output which is excellent in the temperature characteristics.

Figure 5:
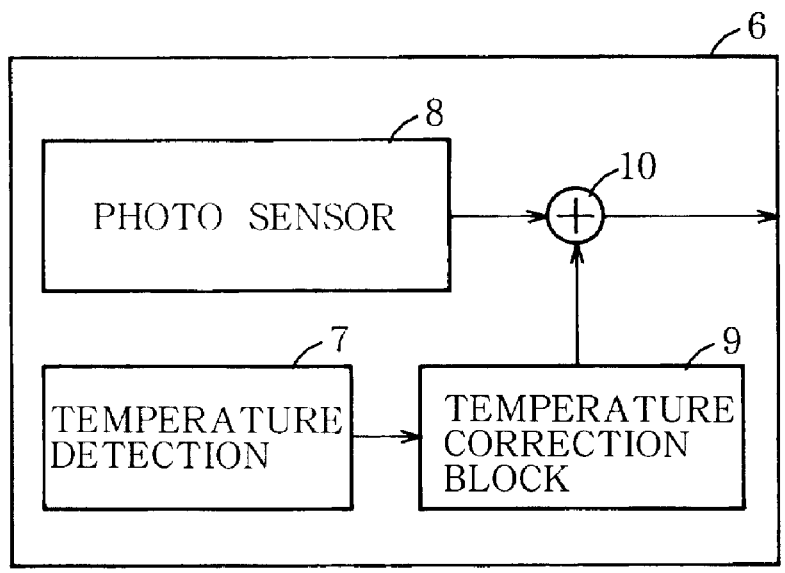
FIG. 5 is a block diagram showing a schematic constitution of a fifth embodiment according to the present invention.

FIG. 5 is a block diagram showing a schematic constitution of a fifth embodiment according to the present invention, wherein the same numeric signs as those of FIG. 4 illustrate the same constituents. In the present embodiment, a temperature correction means 9 and an arithmetic unit 10 are fabricated on a semiconductor substrate 6.

To fabricate even the temperature correction means 9 on the same semiconductor substrate as mentioned above can reduce terminals in number, which makes the sensors having the excellent temperature characteristics easy to be employable and enables even production cost reductions of the system.

Hitherto, the embodiments according to the present invention have been described. Taking the temperature which is immune from the dispersion of the production process parameters can be carried out precisely at the economical constitution in any embodiments mentioned above. Furthermore, as their circuit constitutions are free from the manufacturing process restriction, they can easily be constituted either by the CMOS process or by the photosensor process.

Despite that the temperature detection means for taking the temperature is performed corresponding to the temperature characteristics of the differential voltage between the two emitter-base voltages of the two bipolar transistors in the embodiments mentioned above, other devices might be used so long as they are such devices having rectifying characteristics as a current-voltage (I-V) characteristics shown between the emitter and the base of the bipolar transistor.

Figure 6:
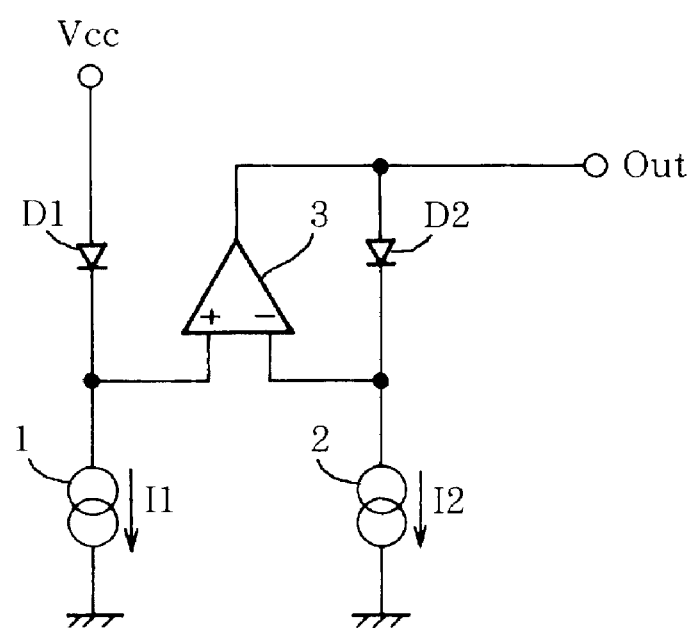
FIG. 6 is a circuit diagram showing a constitution of a sixth embodiment according to the present invention.
Figure 7:
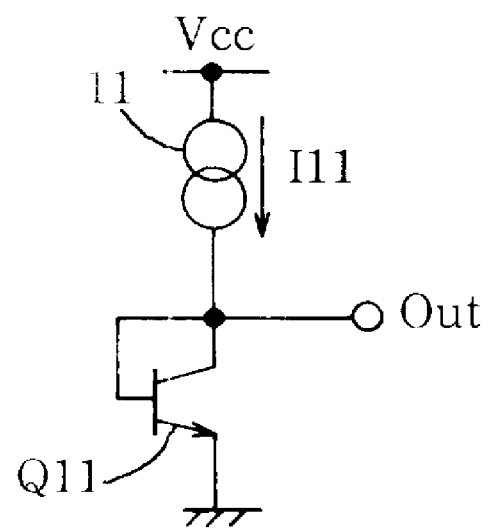
FIG. 7 (PRIOR ART) is a circuit diagram showing a constitution of a conventional example.

As an embodiment of the other devices mentioned above, two diodes having different junction sizes from each other are shown in FIG. 6. Herein D1 stands for a first diode having a different junction size from that of a second diode D2 while the same numeric signs as those shown in FIG. 1 stand for the same components as those of FIG. 1

As mentioned above, precisely detecting the temperature can be performed by the economical constitution according to the embodiments 1–6.

Moreover, it can also be realized at the reduced cost to fabricate the photo-electric conversion apparatus which has the excellent temperature characteristics.

What is claimed is:

1. A temperature detection circuit, comprising:
   a first bipolar transistor of which collector is connected to a DC voltage supply, of which base is connected to a reference voltage source having no temperature-dependent characteristics and of which emitter is connected both to a first constant current source and to one of input terminals of an operational amplifier; and
   a second bipolar transistor of which collector is connected to said DC voltage supply, of which base is connected to an output terminal of said operational amplifier and of which emitter is connected both to a second constant current source and to another of said input terminals of said operational amplifier, wherein:
   a temperature characteristics is obtained from an output produced from said operational amplifier.

2. The temperature detection circuit according to claim 1, wherein:
   said first bipolar transistor and said second bipolar transistor are formed on a single semiconductor substrate.

3. The temperature detection circuit according to claim 1, wherein:
   an emitter size of said first bipolar transistor is enlarged than that of said second bipolar transistor; and
   a current value fed from said second constant current source is enlarged than that fed from said first constant current source, thereby to provide said two transistors with an emitter current density ratio.

4. The temperature detection circuit according to claim 1, wherein:
   an amplification gain in said operational amplifier is enhanced higher, thereby to produce a large voltage output for exhibiting said temperature characteristics.

5. A method of detecting a temperature, comprising steps of:
   forming two bipolar transistors connected in parallel to each other on a single semiconductor substrate;
   providing respective emitter electrodes of said transistors with a current density ratio; and
   detecting said temperature of said semiconductor substrate from a temperature characteristics of a differential voltage between two emitter-base junction voltages which are generated at said step of providing said respective emitter electrodes with said current density ratio,
   wherein one of said transistors has a collector connected to a DC voltage supply, a base connected to a reference voltage source having no temperature-dependent characteristics and an emitter connected to both a first current source and an input terminal of an operational amplifier, and
   the other of said transistors has a collector connected to said DC voltage supply, a base connected to an output terminal of said operational amplifier, and an emitter connected both to a second current source and another input terminal of said operational amplifier.

6. A photo-electric conversion apparatus formed on a single semiconductor substrate, comprising:
   a photosensor device for converting an incident optical signal into an electric signal;
   a temperature detection circuit, including:
      two rectification means each having a rectifying characteristics which are connected in parallel to each other and
      a detection means for detecting a temperature from a temperature characteristics of a differential voltage between two respective voltages across said two respective rectification means which are generated by providing said two rectification means with a current density ratio; and
   a correction means for calibrating an output voltage produced from said photosensor device, corresponding to a detection result delivered from said detection means.

7. The photo-electric conversion apparatus according to claim 6, wherein:

said rectification means includes a bipolar transistor; and said detection means detects said temperature from said temperature characteristics of said differential voltage between said two respective voltages across emitter-base junctions which are generated by providing said two bipolar transistors with said current density ratio.

8. The photo-electric conversion apparatus according to claim 7, wherein:

said temperature detection circuit comprises:

a first bipolar transistor of which collector is connected to a DC voltage source, of which base is connected to a reference voltage source having no temperature-dependent characteristics and of which emitter is connected both to a first constant current source and to one of input terminals of an operational amplifier; and a second bipolar transistor of which collector is connected to said DC voltage source, of which base is connected to an output terminal of said operational amplifier and of which emitter is connected both to a second constant current source and to another of said input terminals of said operational amplifier, and said temperature characteristics is attained from an output voltage produced from said operational amplifier.

9. The photo-electric conversion apparatus according to claim 8, wherein:

said temperature detection circuit applies said emitter current density ratio by enlarging an emitter size of said first bipolar transistor larger than that of said second bipolar transistor and by increasing a current value fed from said second constant current source higher than that fed from said first constant current source.

10. The photo-electric conversion apparatus according to claim 8, wherein:

said temperature detection circuit receives a large output voltage for detecting enough said temperature characteristics by enhancing an amplification gain of said operational amplifier.

11. A temperature detection circuit comprising:

two diodes connected in parallel to each other, one of the two diodes being connected between an input and an output of an operational amplifier; and temperature detection means comprising said operational amplifier for comparing a temperature from a temperature characteristic of a differential voltage between two respective voltages which are generated by providing said two diodes with a current density ratio.

12. The temperature detection circuit according to claim 11, wherein said two diodes are formed on a single semiconductor substrate.

13. The temperature detection circuit according to claim 11, wherein the two diodes have different junction sizes.

14. The temperature detection circuit according to claim 11, wherein the two diodes are connected to different current sources supplying current having different current values.

15. A method of detecting a temperature, comprising:

providing two diodes, connected in parallel to each other, with a current density ratio, one of the two diodes being connected between an input and an output of an operational amplifier; and using said operational amplifier for detecting a temperature based on a temperature characteristics of a differential voltage between respective voltages of the two diodes which are generated at said step of providing said diodes with said current density ratio.

16. The method according to claim 15, further comprising forming said two diodes on a single semiconductor substrate.

17. The method according to claim 15, wherein the two diodes have different junction sizes.

18. The method according to claim 15, further comprising supplying the two diodes with current having different current values.

* * * * *